Nov. 27, 1951     E. SHAPIRO     2,576,860
VIBRATION DAMPING AND SEALING MEANS FOR AIR DUCTS
Filed April 15, 1950
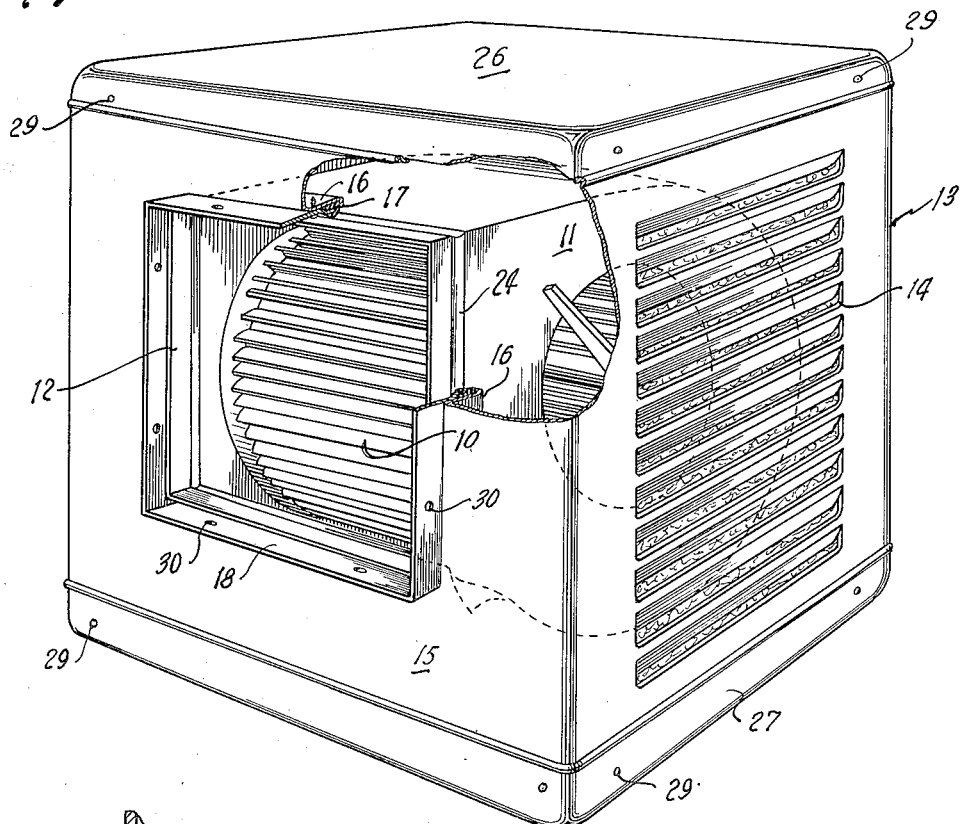
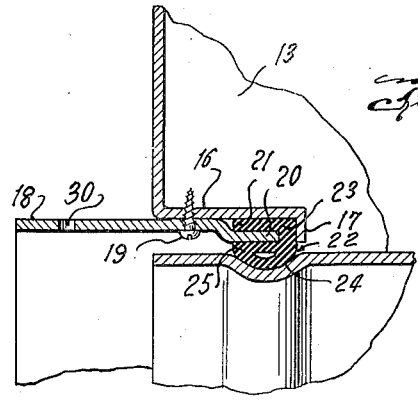
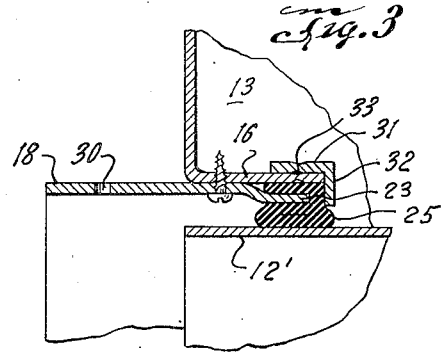
ELI SHAPIRO
INVENTOR.
ATTORNEY Patented Nov. 27, 1951

2,576,860

UNITED STATES PATENT OFFICE 2,576,860

VIBRATION DAMPING AND SEALING MEANS FOR AIR DUCTS

Eli Shapiro, Dallas, Tex., assignor to Dearborn Stove Company, Dallas, Tex.

Application April 15, 1950, Serial No. 156,138

8 Claims. (Cl. 285—90)

This invention relates to seals for use in joining ducts and more particularly to such seals which prevent transmission of vibration and the passage of air through the joint between the ducts.

In many applications the joint between two connected ducts must be air tight and must also prevent the transmission of vibration. For example, the outlet duct of a blower mounted in a cooler cabinet must be connected to a duct which conducts the blown air to discharge it at a point removed from the cabinet. The outlet duct of the blower is, of course, directly connected to the blower which imparts considerable vibrational motion to the outlet duct. This vibrational motion is partly due to the vibration transmitted to the blower by the usual alternating current motor which drives the blower. The latter effect, called an "AC hum," is especially pronounced where the electric motor is mounted directly on the housing of the blower. Since the ducts are usually made of sheet metal the vibrational motion of the duct results in the amplification and creation of noise. Moreover, the pressure in the duct is of a necessity greater than in the cabinet in which the blower is disposed and recirculation of air from the duct into the cabinet through the joint between the duct and the outlet duct will take place unless the joint is air tight.

Accordingly, it is an object of my invention to provide a new and improved seal for a joint between two ducts.

It is another object of my invention to provide a new and improved seal for a joint between two connected ducts which prevents transmission of vibration and passage of air through the joint.

It is another object of my invention to provide a seal for the joint between the outlet duct of a blower, the duct joined to the outlet duct and the cabinet in which the blower is mounted.

It is still another object of my invention to provide a new and improved elastic seal.

Briefly stated, the new and improved seal of my invention is employed to seal the joint between the outlet duct of a blower in a cabinet and a duct which conducts the blown air to a point removed from the cabinet. The cabinet is provided with a rectangular aperture formed by a flange which extends upwardly into the cabinet. In one application of my invention, the upwardly extending flange is provided with a seal retaining flange which extends perpendicularly from the inwardly extending flange into the aperture. The duct which is to be connected to the outlet duct of the blower has an end which is telescoped into the inwardly extending flange and is secured to the sides by any conventional means. The outlet duct of the blower which is located in the cabinet is telescoped in turn into the duct.

An elastic seal consisting of an inner bead and an outer flange connected to the bead by a web is interposed in the joint between the duct, the outlet duct and the inwardly extending flange of the cabinet. The bead is disposed between the duct and the outlet duct while the flange of the seal lies between the end of the first duct and the inwardly extending flange of the cabinet. The flange of the seal is maintained in its place between the duct and the inwardly extending flange by the seal retaining flange which abuts the web of the seal. The bead of the seal is compressed between the two ducts and, since it is formed of elastic material, the bead holds the ducts together firmly but yieldingly. If desired the outlet duct may be provided with a groove in which the bead of the seal is located.

For a better understanding of my invention reference may be had to the following description taken in connection with the accompanying drawing and its scope will be pointed out in the appended claims.

In the drawing,

Figure 1 is a perspective view of a cabinet provided with the seal, some parts being shown partly broken away;

Figure 2 is a sectional view showing the portion of the seal with respect to the ducts and cabinet; and Figure 3 is a sectional view showing the seal employed with modified forms of the cabinet and outlet shown in Figures 1 and 2.

Referring now especially to Figures 1 and 2, a blower 10 having a housing 11 and an outlet duct 12 is mounted in a cabinet 13 having sides provided with apertures 14. The front side 15 has a rectangular opening formed by a flange 16 which extends inwardly into the cabinet 13. The flange 16 is provided with a perpendicular extension or flange retainer 17 which extends into opening formed by flange 16.

A duct 18 is telescoped within flange 16 and is rigidly secured to flange 16 by any conventional means, such as self tapping screws 19. The inner end 20 of duct 18 is slightly bent from flange 16 to form a space in which is received the outward flange 21 of a single piece elastic seal 22. The inner end 20 is also spaced from flange 17. The web 23 of seal 22 is interposed between inner end 22 and flange 17.

The outer surface of outlet duct 12 is provided with a groove 24 which extends completely about outlet duct 12. The bead 25 of seal 22 is disposed between the inner end 20 of duct 18 and the outlet duct 12 having its inner surface seated in groove 24. Seal 22 is preferably formed of extruded rubber although a seal 22 of any other suitable elastic material could be employed. It will be noted that bead 25 is hollow. This hollow form construction of bead 22 permits greater compressibility of bead 22 and adds to its elasticity. It will be noted that outlet duct 12 does not contact duct 18 or cabinet 10 at any point.

All or almost all vibrations of outlet duct 12 are absorbed by seal 22 because of its elastic properties. Duct 18 will therefore be free from substantially all vibrations. Seal 22 is of such dimensions with respect to flange 16, duct 18 and outlet duct 12 that it is compressed between these elements when in position. Seal 22 therefore renders the joint between these elements air tight.

In connecting duct 18 to cabinet 13 and blower 10, the duct 18 is first telescoped into flange 16 with flange 21 and web 23 of seal 22 separating its inner end 20 from flanges 16 and 17, respectively. The screws 19 are then employed to fasten duct 18 to flange 16. The outlet duct 12 is thereafter moved into telescoping relation with duct 18 compressing bead 25 against inner end 20. Outlet duct 12 is then moved into duct 18 until bead 25 enters the groove 24 in outlet duct 12. Since cabinet 13 is provided with a removable top 26 and a removable bottom 27 secured to the wall member 28 by screws 29 or any other suitable fastening means, housing 11 and outlet duct 12 are easily accessible and can be moved relative to wall 15 in order to connect duct 18 and outlet duct 12.

Duct 18 is provided with screw holes 30 by means of which other duct work or louvers may be attached to duct 18. Cabinet 13 is also provided with evaporative cooling means which cools the air drawn in through apertures 14 but which is not shown since it constitutes no part of this invention. The electric motor, not shown, for driving blower 10, may be mounted on housing 11.

Figure 3 illustrates modified forms of cabinet 13 and outlet duct 12. The flange 16 shown in Figure 3 is not provided with an integral flange 17 as in the flange 16 of Figures 1 and 2. An L-shaped member having sides 31 and 32 is therefore secured to flange 16 by any conventional means, such as spot welding 33, in order to provide the member 32 against which web 23 abuts. The outlet duct 12' is not provided with a groove, such as groove 24 of Figures 1 and 2. Bead 25, therefore, is maintained under greater compression but the seal 22 functions in the same manner to absorb vibrations and seal the joint between outlet duct 12' and duct 18 against passage of air from duct 18 into the cabinet 13.

It will be apparent to those skilled in the art that the seal 22 may be employed to seal the joint between any two ducts of similar shape. For example seal 22 may be employed with cylindrical as well as rectangular ducts. The seal 22 may be a continuous molded piece designed for particular sized ducts 12 and 18 or may be extruded in any length from which a suitable piece is cut for a particular duct. The piece will then be of such length as to fit entirely around the duct 12 and have its ends abutting each other. Compression of bead 25 between ducts 12 and 18 will then push the two ends into close contact effectively sealing their juncture against the passage of air.

While there has been shown and described particular embodiments of my invention, it will be obvious to those skilled in the art that various changes and modifications can be made without departing from my invention and it is therefore the aim in the appended claims to cover all such changes and modifications as fall within the true spirit and scope of my invention.

What is claimed is:

1. In combination: a wall member provided with an aperture; a flange extending perpendicularly from said wall member and forming the sides of said aperture; a first duct secured in said aperture to said flange; a second duct subject to vibration extending into said first duct; and an elastic seal comprising a bead, a seal flange parallel to and spaced from said bead, and a web integral with and connecting said bead and said seal flange, said seal flange being disposed between said flange and said first duct and said bead being disposed between said first duct and said second duct, said seal being compressed between said ducts and said flange.

2. The device of claim 1, and a seal retaining flange extending inwardly into said aperture from said flange, said seal retaining flange abutting said web to prevent displacement of said seal.

3. The device of claim 2, said second duct being provided with a groove, said bead being disposed in said groove.

4. The device of claim 1, said second duct being provided with a groove, said bead being disposed in said groove.

5. In combination: a member provided with an aperture; a first flange extending perpendicularly from said wall member about said aperture; a second flange perpendicular to said first flange extending from said first flange into said aperture; an elastic seal disposed within and about said aperture and having a flat seal flange abutting said first flange, a bead extending parallel to and spaced from said seal flange, and a web connecting said seal flange and said bead and abutting said second flange, said seal flange, bead and web forming a channel; a first duct secured to said first flange and having an end disposed in said channel; and a second duct having an end disposed within said first duct, said second duct being maintained in spaced relation to said first duct by said bead, said bead being compressed between said first and second ducts.

6. The device of claim 5, said second duct being provided with a continuous groove, said bead being disposed in said groove.

7. In combination: a cabinet having a wall provided with an aperture; a first flange extending perpendicularly from said wall member about said aperture into said cabinet; a second flange perpendicular to said first flange extending from said first flange into said aperture; an elastic seal disposed within and about said aperture and having a flat seal flange abutting said first flange, a bead extending parallel to and spaced from said seal flange, and a web connecting said seal flange and said bead and abutting said second flange, said seal flange, bead and web forming a channel; a first duct rigidly secured to said first flange and having an end disposed in said channel; an outlet duct having an end disposed in said first duct, said outlet duct being maintained in spaced relation to said first duct by said bead, said bead being compressed between said ducts.

8. The device of claim 7, said outlet duct being provided with a continuous groove, said bead being disposed in said groove.

ELI SHAPIRO.

REFERENCES CITED

The following references are of record in the file of this patent:

UNITED STATES PATENTS

| Number | Name | Date |
|---|---|---|
| 483,948 | Smart | Oct. 4, 1892 |
| 2,265,693 | Knight | Dec. 9, 1941 |
| 2,450,647 | Essick | Oct. 5, 1948 |